United States Patent
Farrell et al.

(10) Patent No.: US 6,817,818 B2
(45) Date of Patent: Nov. 16, 2004

(54) METAL PIERCING FASTENER WITH OPTIMALLY RESILIENT SECURING MEMBER

(75) Inventors: Mark A. Farrell, Conroe, TX (US); Michael E. Farrell, Murrieta, CA (US)

(73) Assignee: Evening Star International, Inc., Conroe, TX (US)

( * ) Notice: Subject to any disclaimer, the term of this patent is extended or adjusted under 35 U.S.C. 154(b) by 0 days.

(21) Appl. No.: 10/393,879

(22) Filed: Mar. 21, 2003

(65) Prior Publication Data

US 2003/0180121 A1 Sep. 25, 2003

Related U.S. Application Data

(63) Continuation-in-part of application No. 09/724,333, filed on Nov. 28, 2000.

(51) Int. Cl.[7] .................................................. P16B 15/06
(52) U.S. Cl. ........................ 411/450; 411/456; 411/478
(58) Field of Search ................................. 411/477, 478, 411/451.1, 456, 451.3, 454

(56) References Cited

U.S. PATENT DOCUMENTS

| | | | | |
|---|---|---|---|---|
| 1,338,988 | A | | 5/1920 | Kinoshita |
| 1,417,818 | A | * | 5/1922 | Oltz .............................. 411/456 |
| 1,934,134 | A | | 11/1933 | McChesney |
| 2,155,893 | A | | 4/1939 | Fulton |
| 2,319,058 | A | | 5/1943 | Hansman |
| 2,382,474 | A | | 8/1945 | Gambo |
| 2,530,229 | A | * | 11/1950 | Clark .......................... 411/456 |
| 2,564,643 | A | | 8/1951 | Hall |
| 2,740,505 | A | | 4/1956 | Flora |
| 2,751,052 | A | | 6/1956 | Flora |
| 2,958,562 | A | * | 11/1960 | Frost ........................... 403/367 |
| 3,618,447 | A | * | 11/1971 | Goins .......................... 411/456 |
| 3,882,755 | A | | 5/1975 | Enstrom |
| 3,973,295 | A | | 8/1976 | Janke |
| 3,983,779 | A | | 10/1976 | Dimas |
| 6,659,700 | B1 | * | 12/2003 | Farrell et al. ............... 411/450 |

* cited by examiner

Primary Examiner—Flemming Saether
(74) Attorney, Agent, or Firm—Fulbright & Jaworski L.L.P.

(57) ABSTRACT

A metal piercing fastener includes an elongated body with an internal void and a securing member carried by the elongated body and adapted to grip and lock pierced work pieces together. The securing member is adapted to be accommodated in the internal void and is twisted about its longitudinal axis. The twisted securing member includes a substantial portion being thinned relative to the thickness of the elongated body to optimize resiliency of the securing member.

12 Claims, 2 Drawing Sheets

METAL PIERCING FASTENER WITH OPTIMALLY RESILIENT SECURING MEMBER

RELATED APPLICATIONS

The present application is a continuation-in-part (CIP) of pending U.S. patent application Ser. No. 09/724,333, filed Nov. 28, 2000, by the same inventors, and having the same Assignee.

FIELD OF THE INVENTION

The present invention relates generally to fasteners and more particularly to a metal piercing fastener with an optimally resilient securing member carried by the body of the fastener and adapted to be accommodated within a void provided within the body of the fastener.

BACKGROUND OF THE INVENTION

Fastener designs for securing work pieces together, such as, for example, a top laminate non metal work piece to a bottom light-gauge metal substrate (18 gauge and thinner) or alternatively, a light-gauge metal work piece to light-gauge metal substrate have generally been accomplished by threaded fasteners. The helical design of the thread has been successful in pulling the top laminate materials together tightly with the light-gauge metal substrate. Additionally, the helical thread design has provided sufficient withdrawal resistance to achieve performance values acceptable to industry. However, installation of helical threaded fasteners has proven time-consuming and fatiguing to the installer. The industries using these light-gauge metals require a fastener that has the speed of pneumatic nailing systems with the gripping and clamping features of helical-thread fasteners.

Nail-like products (hardened pins) have been used successfully in attaching work pieces (including top metals) to heavier gauge metal substrates (16 gauge and thicker). However, when the metal substrate is of light-gauge metal (18 gauge and thinner) or two or more pieces of light-gauge metal (18 gauge and thinner) are to be joined together, the substrate may be pushed away (deflection) from the top piece before the penetration and fastening process is completed. Additionally, the thinness of these metals is such that it creates situations where there is insufficient material to provide a friction-lock for current state-of-the-art pins. Whether they incorporate barbs, protrusions, undercuts, cross-hatching or spiral threads, these hardened pins lack withdrawal resistance when installed in these light-gauge materials. Additionally, they lack the ability to pull the substrate and the work piece together to close the gap between them caused by the deflection when the metal substrate of light-gauge metal is pushed away by penetration forces.

L. H. Flora (U.S. Pat. No. 2,740,505), discloses a one-piece, spring steel roofing nail for attaching insulation to a sheet metal deck. This roofing nail incorporates a center tongue within a cutout of the body, a point for piercing the light-gauge metal deck, and a head, bent in an angle from the same material as the body, used for clamping of the insulation layer. The center tongue is bent or deformed along its horizontal plane. This deformation is used to create a cam action to move the tongue within the pierced hole in the metal deck when the roofing nails are seated by successive hammer blows. The tongue protrudes through the hole with opposite flat surfaces thereof engaging opposite marginal edges of the hole and thus rely upon a wedge created by these two points to lock the nail in place. The main problem with this design is the lack of positive engagement of the tongue within the hole. Relying upon the smooth, radius area of the horizontal cam deformation of the tongue is unsuccessful and does not provide a positive locking means that meets industry standards to resist withdrawal forces. Such was recognized by Flora and referred to in his continuation-in-part, U.S. Pat. No. 2,751,052.

L. H. Flora (U.S. Pat. No. 2,751,052) discloses essentially the same structure as Flora U.S. Pat. No. 2,750,505 but with the center tongue extending completely through the pierced hole with the end of the tongue contacting the underside of the metal deck to provide a positive lock. The tight clamping of the insulation to the light-gauge metal deck is dependent upon the relatively soft porous and somewhat compressible insulation expanding from its compressed condition under the head when the nail is driven only to a predetermined depth as established by side stops. Although the tongue end engaging the underside of the metal deck improves withdrawal resistance, the structure of the nail precludes its use in substantially non-compressible materials and materials of different manufacturing thickness as well as manufacturing tolerances.

Dimas (U.S. Pat. No. 3,983,779) discloses a roofing nail designed to correct flaws in prior art roofing nails including the Flora design. The Dimas roofing nail is made substantially upon Flora's original design with one or more tangs deformed along a horizontal plane, engaging the underneath of the bottom light-gauge metal deck. A protrusion is provided which leads the tang(s) to provide a pilot slot through which the tang(s) passes. This pilot slot solves a problem of prior art tongues or tangs becoming weakened or destroyed when passing through the pierced hole. The reason that the prior art tongues or tangs were weakened or destroyed is that they were substantially non-resilient. The Dimas improvement of Flora, by enlarging the hole for tang(s) passage, allows the possibility of the tang(s) coming lose and returning back through the enlarged hole if there is lateral movement or vibration to the wall or roof (which is common in buildings).

SUMMARY OF THE INVENTION

A fastener for securing a work piece to a metal substrate comprising an elongated body including a crown portion, a tip portion adapted to penetrate the substrate and form an opening therein, and at least one internal void disposed between the crown and tip portions, the elongated body having a thickness dimension; and at least one securing member having a thickness which is less than that of said body carried by the elongated body between the crown and tip portions and having side edges and adapted to grip and lock the work piece to the substrate after penetration, the securing member being adapted to be accommodated in the internal void and having a longitudinal axis, the securing member being deformed about its longitudinal (vertical) axis to cause said side edge(s) to extend outwardly from said body to ensure positive locking to the substrate within the pierced hole.

BRIEF DESCRIPTION OF THE DRAWINGS

The invention is generally shown by way of example in the accompanying drawings in which.

DETAILED DESCRIPTION OF THE PREFERRED EMBODIMENTS

Hereinafter, some preferred embodiments of the present invention will be described in detail with reference to the related drawings of FIGS. 1–5. Additional embodiments, features and/or advantages of the invention will become apparent from the ensuing description or may be learned by practicing the invention.

The drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
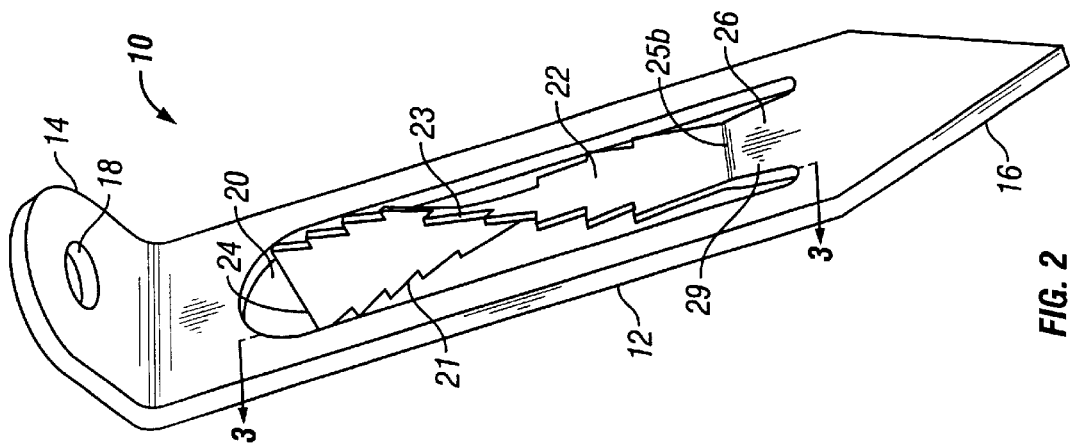
FIG. 1 is a front perspective view of a metal piercing fastener having a resilient securing member in accordance with one embodiment of the present invention.

Turning to FIG. 1, a metal piercing fastener 10 comprises a generally elongated metal body 12 having a crown portion 14 at one end adapted to receive the force of impact from an appropriately configured power tool (not shown) adapted to drive fastener 10 through a plurality of work pieces (at least one of which is a metal substrate) and a piercing tip (or point) portion 16 at an opposite end adapted to form an opening through the work pieces. The crown portion 14 may be provided with an aperture 18, as generally shown in FIGS. 1–2, to allow for bonding of drywall plaster, paint or other suitable material to the top work piece in the area around the crown portion 14.

Figure 2:
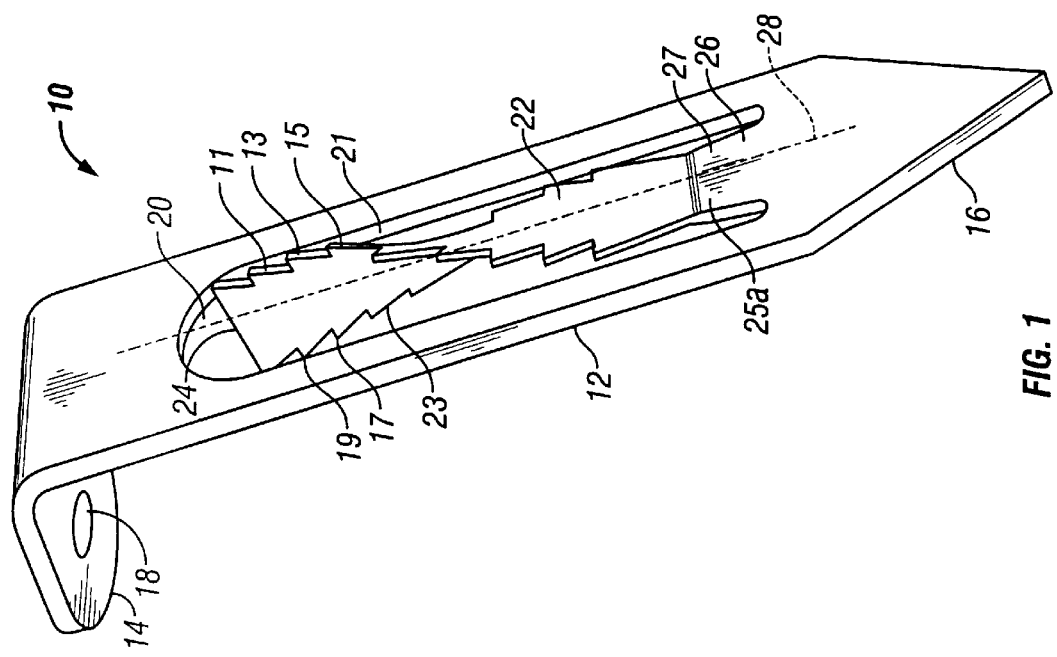
FIG. 2 is a back perspective view of the metal piercing fastener of FIG. 1.

The elongated metal body 12 is preferably provided somewhat centrally with an internal void 20 adapted to accommodate a resilient securing member or tine 22 carried by the body 12, as generally shown in FIGS. 1–2. The resilient tine 22 is of somewhat elongated configuration (FIGS. 1–3) having a longitudinal axis 28, as generally depicted in FIG. 1. In one embodiment of the present invention, the tine 22 may be configured as a torsion bar having a free first end 24 (FIG. 1) and an oppositely disposed second end (base) 26 (FIG. 1) being integral or formed unitarily with the metal body 12.

Figure 3:
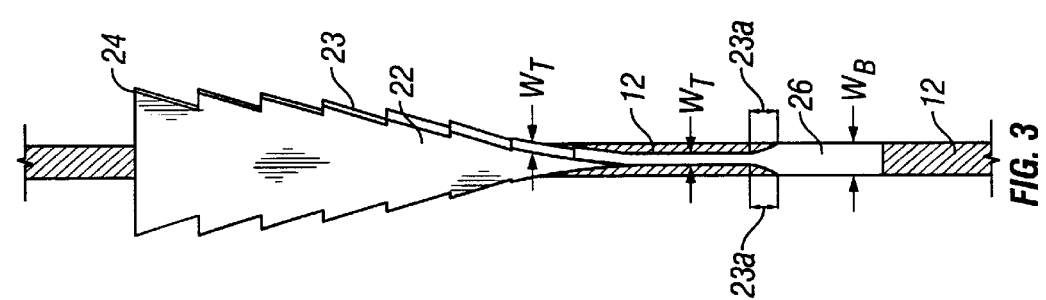
FIG. 3 is a cross-sectional view along section lines 3—3 of FIG. 2.

The tine 22 is preferably twisted about the longitudinal axis 28 in a generally helical configuration, as generally illustrated in FIGS. 1–3. Such twisting causes the side edges of the tine 22 to protrude outwardly from the body 12 in such a way that the side edges 21 and 23 of the tine engage the surface defining the opening formed in the work piece and substrate. That is, the tine depth when measured as viewed in FIG. 1 between the locking teeth 11, 13, 15 and 17, 19, respectively, is greater than the width of the opening formed by the point 16 and body 12 in the work pieces. In one exemplary embodiment of the present invention, the free end 24 of the helically twisted tine 22 may be turned about 80° to 90° relative to base 26. For example, the tine 22 may be folded along its longitudinal axis 28 into a "V" shape so that the edges of the "V" or "U" and the apex of the "V" or "U" engage the surface defining the opening through the substrate. Alternatively, one side edge (21 or 23) may be bent so that the side edge extends outwardly from the surface of the body 12 or both side edges (21 and 23) may be so bent. Such bending allows the side edges 21 and/or 23 to engage the surface defining the opening through the substrate. Other deformations of the tine 22 about its longitudinal axis may be accomplished so long as one or both side edges engage the surface defining the opening to accomplish the locking and clamping function. Each of these configurations may also be accomplished during the stamping process used for producing the fasteners. The tine 22 may be helically twisted using a stamping die with the degree of twisting generally dependent on the particular configuration of the stamping die. Other tine orientations may be utilized provided such other tine orientations agree with the intended purpose of the present invention. Other manufacturing methods may be used provided there is no departure from the intended scope of the present invention.

In accordance with another embodiment of the present invention, the tine 22 is preferably provided with a plurality of integral side gripping and locking elements, such as, for example, outwardly (away from longitudinal axis 28) protruding teeth-like gripping and locking elements 11, 13 and 15 disposed on a first side edge 21 (FIG. 1) of the tine 22, and 17 and 19 disposed on a second side edge 23 (FIG. 1) of the tine 22, respectively, adapted to enhance the gripping and locking action of the metal piercing fastener 10 after work piece penetration. The location of each outwardly protruding gripping and locking element and the spacing between gripping and locking elements may be configured to accommodate different grip range requirements. The bottom surface (facing toward the tip portion 16) of each outwardly protruding gripping and locking element is preferably slanted toward the longitudinal axis 28 (i.e., cut at a radius) to allow it to easily ride over the sharp top edge of a pierced (by the tip portion 16) slot/opening in the metal substrate. The top surface (facing toward the underside of the crown portion 14) of each outwardly protruding gripping and locking element generally forms an acute angle with its respective bottom surface and is preferably shaped to provide a frictional lock function for the tine 22.

During work piece penetration, the helically twisted or longitudinally deformed tine 22 is partially deformed (unwound) along a vertical plane intersecting the longitudinal axis 28. When portions of the outwardly protruding gripping and locking elements on the tine 22 are no longer constrained by pierced work pieces, the tine 22 because of its resilience rewinds back as much as possible to its preset helical orientation causing partial rotation of the top surfaces of the outwardly protruding gripping and locking elements about the longitudinal axis 28 which frictionally wedges the portion of the tine 22 disposed within the pierced opening securely against the inner surface defining the pierced opening or hole in the work pieces.

A person skilled in the art would readily recognize that other gripping and locking element configurations may be used, such as, for example, protrusions, louvers, distortions, or the like formed during the stamping process used to manufacture the fastener of the present invention. Furthermore, the disposition of gripping and locking elements does not have to be constrained to opposite side edges of the tine (of FIG. 1). For example, the tine of FIG. 1 may incorporate protrusions, louvers, distortions, or the like disposed substantially over the entire outer surface of the tine 22 to enhance the gripping and locking capability of the metal-piercing fastener.

To optimize resiliency, a substantial portion of the tine 22 is thinned to a thickness which renders the tine 22 optimally resilient (with the thickness of tine 22 measured relative to the thickness of elongated metal body 12), i.e. $W_T < W_B$, where $W_T$ (FIG. 3) refers to the thickness of the resilient (thinned) portion of the securing tine 22, while $W_B$ (FIG. 3) refers to the thickness of the elongated metal body 12, as generally illustrated in FIG. 3. Alternatively, a pre-defined relatively smaller portion of the tine 22 may be thinned relative to the thickness of the elongated metal body 12 to enhance the resiliency of the tine 22 depending on fastener application. In either case, a line of demarcation such as line 25a marks generally the beginning of the thinned portion of the tine 22 on a first side 27 of the tine 22, and a line of demarcation such as 25b marks generally the beginning of the thinned portion of the tine 22 on a second side 29 of the tine 22, respectively, with tine base 26 being generally defined as the portion of the tine 22 disposed behind the demarcation lines 25a, 25b, as generally illustrated in FIGS. 1–2. The portion of the tine 22 disposed immediately forward of the demarcation lines 25a, 25b is of a somewhat tapered configuration—see, for example, generally tapered portion 23a (FIG. 3) of the second side edge 23. The tine 22 may be thinned during the stamping process by using progressively closer spaced stamping dies with the amount of thinning generally dependent on the particular configuration of the stamping die. Other manufacturing methods may be used provided there is no departure from the intended scope of the present invention. It has been found that best performance of the fastener of the present invention is produced when the tine 22 thickness is approximately one half (½) of the thickness of the body 12.

In one exemplary embodiment of the present invention, a blank made from an appropriately sized sheet of C1045 spring steel may be used to stamp a metal piercing fastener (as generally shown in FIGS. 1–3) with body thickness ($W_B$) of about 0.8 mm and tine thickness ($W_T$) of about 0.4 mm followed by heat treatment of the formed fastener. In another exemplary embodiment of the present invention, a blank made from an appropriately sized sheet of C1045 spring steel may be used to stamp a metal piercing fastener (as generally shown in FIGS. 1–3) with body thickness ($W_B$) of about 1.0 mm and tine thickness ($W_T$) of about 0.4 mm followed by heat treatment of the formed fastener. In yet another exemplary embodiment of the present invention, a blank made from an appropriately sized sheet of C1090 spring steel may be used to stamp a metal piercing fastener (as generally shown in FIGS. 1–3) with an elongated metal body having a generally uniform body thickness ($W_B$) of about 1.0 mm and an integral tine incorporating a gradual reduction in thickness to enhance tine resiliency, as generally shown in FIG. 3, with tine thickness ($W_T$) being generally in the range of about 0.9 mm to about 0.4 mm followed by heat treatment of the formed fastener. Other variations on tine thickness reduction for the purpose of optimizing tine resiliency are possible, provided such other variations do not depart from the intended spirit and scope of the present invention.

Figure 5:
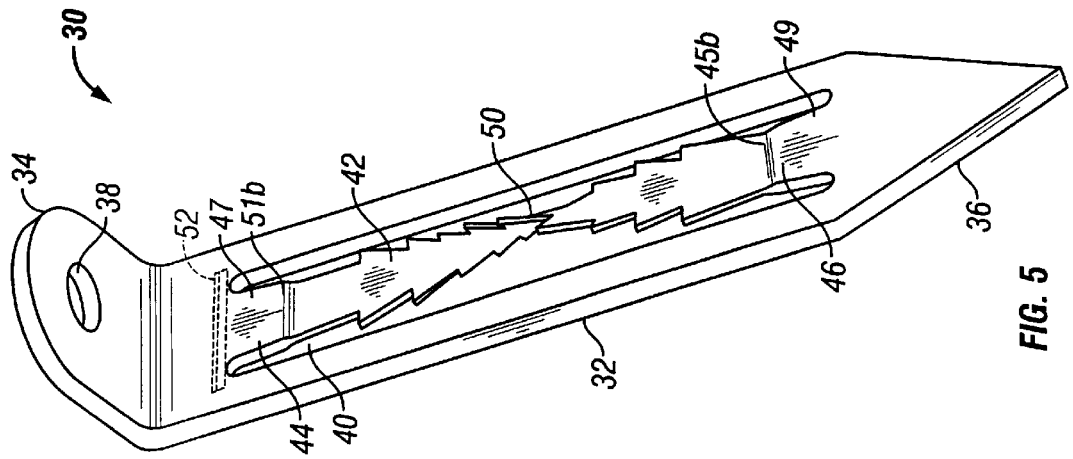
FIG. 5 is a back perspective view of the metal piercing fastener of FIG. 4.
Figure 4:
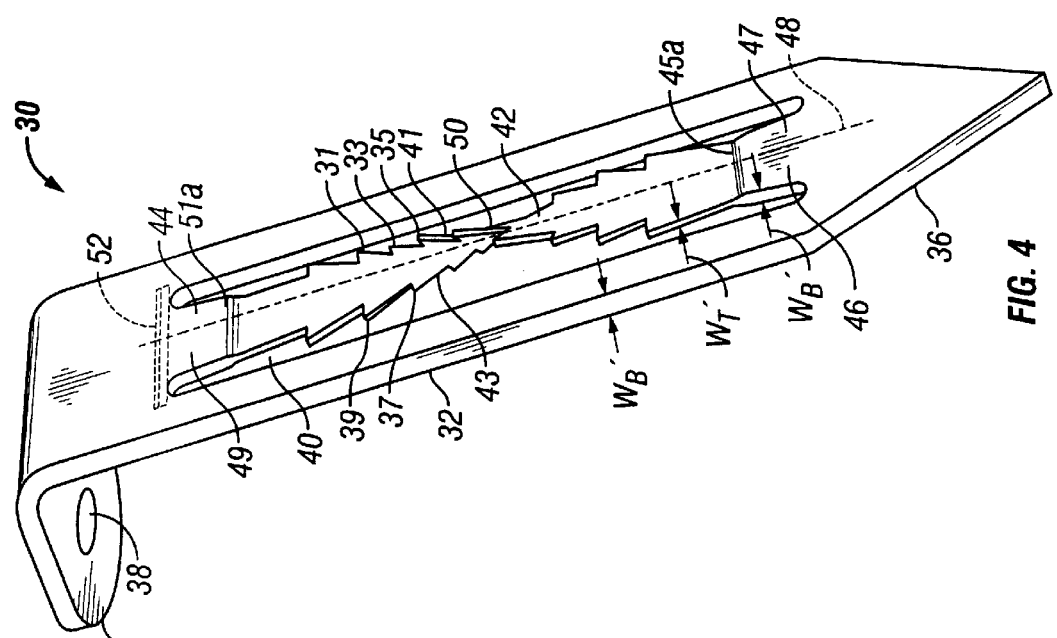
FIG. 4 is a front perspective view of a metal piercing fastener having a resilient securing member in accordance with another embodiment of the present invention.

Turning to FIGS. 4–5, a metal piercing fastener 30 comprises a generally elongated metal body 32 having a crown portion 34 at one end adapted to receive the force of impact from an appropriately configured power tool (not shown) adapted to drive the fastener 30 through a plurality of work pieces (at least one of which is a metal substrate) and a piercing tip (or point) portion 36 at an opposite end adapted to form an opening through the work pieces. The crown portion 34 may be provided with an aperture 38 to allow for bonding of drywall plaster, paint or other suitable material to the top work piece in the area around the crown portion 34. The elongated metal body 32 is preferably provided somewhat centrally with an internal void 40 adapted to accommodate a resilient securing member or tine 42 of somewhat elongated configuration having a longitudinal axis 48 and top and bottom ends (bases) 44, 46, respectively, being preferably integral with body 32 in accordance with an alternative embodiment of the present invention, as generally shown in FIGS. 4–5.

The tine 42 is preferably twisted (or otherwise deformed as above described) about the longitudinal axis 48 in a generally helical configuration, as generally illustrated in FIGS. 4–5 for the purpose specified above. Tine 42 (FIGS. 4–5) may be formed, for example, by extending and twisting free (unsupported) first end 24 of the tine 22 (FIG. 1) until it can be coupled to metal body 12 (FIG. 1) at the upper (proximate to the crown portion 14) edge of internal void 20 corresponding to tine coupling zone 52 of FIG. 4. In such configuration, the free (unsupported) end of a flat tine piece (which is of unitary construction at the opposite end with the body of the fastener) would have to be twisted about 180° about its longitudinal axis before it can be coupled to the upper edge of the internal void during manufacturing of the metal piercing fastener. Coupling may be accomplished in a variety of ways such as crimping or swaging the two parts together.

In accordance with another embodiment of the present invention the tine 42 may be provided with a plurality of integral side gripping and locking elements, such as, for example, outwardly (away from longitudinal axis 48) protruding teeth-like gripping and locking elements (teeth) 31, 33 and 35 disposed on a first side edge 41 (FIG. 4) of tine 42, and 37 and 39 disposed on a second side edge 43 (FIG. 4) of the tine 42, respectively, adapted to enhance the gripping and locking action of the metal piercing fastener 30 after work piece penetration. These elements function in the same manner as the similar elements described above conjunction with the fastener illustrated in FIGS. 1–3.

As was the case with the tine 22, a substantial portion of the tine 42 is thinned to a thickness which renders the tine 42 optimally resilient (with the thickness of the tine 42 measured relative to the thickness of elongated metal body 32), i.e. $W'_T < W'_B$, where $W'_T$ (FIG. 4) refers to the thickness of the resilient (thinned) portion of securing member (tine) 42, while $W'_B$ (FIG. 4) refers to the thickness of the elongated metal body 32, as generally illustrated in FIG. 4.

The tine 42 may be thinned during fabrication of the fastener by using a stamping die with the amount of thinning generally dependent on the particular configuration of the stamping die. Other manufacturing methods may be used provided there is no departure from the intended scope of the present invention.

It has been found that the best performance of the fastener of the embodiment shown in FIGS. 4 and 5 is provided when the thickness of the tine 42 is approximately one half (½) the thickness of the body 32. The specific examples of materials and thickness set forth above with respect to the fastener shown in FIGS. 1–3 are equally applicable to the fastener 30.

The above-described novel metal piercing fastener is well suited to effectively hold a plurality of work pieces together under severe weather conditions such as hurricanes, tornadoes, earthquakes, or the like.

A person skilled in the art would recognize that other components and/or configurations may be utilized in the above-described embodiments, provided such other components and/or configurations do not depart from the intended purpose and scope of the present invention.

While the present invention has been described in detail with regard to one or more exemplary embodiments, it should also be appreciated that various modifications and variations may be made in the present invention without departing from the scope or spirit of the invention. In this regard it is important to note that practicing the invention is not limited to the applications described hereinabove. Many other applications and/or alterations will be apparent to those skilled in the art.

It should be appreciated by a person skilled in the art that features illustrated or described as part of one embodiment may also be used in other embodiments. It is, therefore, intended that the present invention cover all such modifications, embodiments and variations as long as they come within the scope of the appended claims and their equivalents.

What is claimed is:

1. A metal piercing fastener for securing a plurality of work pieces together, including a metal substrate, said fastener comprising:
   (a) a substantially flat elongated metal body including a crown portion, a tip portion adapted to penetrate the work pieces, and said flat metal body defining at least one internal void disposed between said crown and tip portions and surrounded by said body, said elongated body having a first thickness dimension; and
   (b) at least one securing member having side edges carried by said elongated body between said crown and tip portions,
   said at least one securing member adapted to be accommodated in said at least one internal void and having a longitudinal axis,
   said at least one securing member being deformed about said longitudinal axis so that at least a portion thereof extends in a direction lateral to said body to enable at least one of said side edges to grip and lock the work pieces together after penetration,
   said at least one deformed securing member having a substantial portion having a second thickness dimension, said second thickness dimension being less than said first thickness dimension of said elongated body to optimize resiliency of said at least one securing member.

2. The fastener of claim 1, wherein said securing member substantial portion incorporates a gradual reduction in thickness relative to said thickness dimension of said elongated body.

3. The fastener of claim 1, wherein said securing member substantial portion second thickness is reduced approximately by a factor of ½ relative to said thickness to said first thickness dimension of said elongated body.

4. The fastener of claim 1, wherein said securing member substantial portion second thickness is reduced approximately by a factor of ⅖ relative to said first thickness dimension of said elongated body.

5. The fastener of claim 1, wherein at least one line of demarcation on at least one side of said at least one securing member marks the beginning of said second thickness substantial portion.

6. The fastener of claim 5, said at least one securing member having a tapered portion being disposed immediately forward of said at least one line of demarcation.

7. A fastener for securing a plurality of work pieces together, said fastener comprising:
   (a) an elongated body including a crown portion, a tip portion adapted to penetrate the laminar work pieces leaving an aperture having width therein, and at least one internal void disposed between said crown and tip portions, said elongated body having a thickness dimension; and
   (b) at least one securing member carried by said elongated body between said crown and tip portions and adapted to grip and lock the work pieces together after penetration,
   said at least one securing member adapted to be accommodated in said at least one internal void and having a longitudinal axis,
   said at least one securing member being twisted about said longitudinal axis such that the securing member depth is greater than the width of said aperture,
   said at least one twisted securing member having at least one pre-defined portion being thinned relative to said thickness dimension of said elongated body to enhance the resiliency of said at least one securing member.

8. The fastener of claim 7, wherein said at least one pre-defined thinned portion incorporates a gradual reduction in thickness relative to said thickness dimension of said elongated body.

9. The fastener of claim 7, wherein said at least one pre-defined portion is being thinned approximately by a factor of ½ relative to said thickness dimension of said elongated body.

10. The fastener of claim 7, wherein said at least one pre-defined portion is being thinned approximately by a factor of ⅖ relative to said thickness dimension of said elongated body.

11. The fastener of claim 7, wherein at least one line of demarcation on at least one side of said at least one securing member marks the beginning of said at least one pre-defined thinned portion.

12. The fastener of claim 11, wherein said at least one securing member having a tapered portion being disposed immediately forward of said at least one line of demarcation.

* * * * *